United States Patent
Fuse et al.

(10) Patent No.: US 8,441,664 B2
(45) Date of Patent: May 14, 2013

(54) PRINTING APPARATUS, DETECTION SYSTEM, AND METHOD COMPUTER READABLE MEDIUM FOR CREATING DOCUMENT

(75) Inventors: Mario Fuse, Ashigarakami-gun (JP); Shoji Yamaguchi, Ashigarakami-gun (JP); Yasunori Koda, Ashigarakami-gun (JP); Shinji Tabata, Ashigarakami-gun (JP); Kunihiro Takahashi, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1283 days.

(21) Appl. No.: 11/934,275

(22) Filed: Nov. 2, 2007

(65) Prior Publication Data

US 2008/0304098 A1      Dec. 11, 2008

(30) Foreign Application Priority Data

Jun. 8, 2007   (JP) .................... 2007-152901

(51) Int. Cl.
*G06K 15/00* (2006.01)
(52) U.S. Cl.
USPC .............................. 358/1.15; 358/1.1; 358/1.9
(58) Field of Classification Search ................ 358/1.14, 358/1.1, 1.9, 1.15
See application file for complete search history.

(56) References Cited

U.S. PATENT DOCUMENTS

| | | | |
|---|---|---|---|
| 5,660,663 A * | 8/1997 | Chamberlain et al. | 156/152 |
| 2007/0253022 A1 * | 11/2007 | Oshima | 358/1.15 |
| 2008/0094216 A1 * | 4/2008 | Catania | 340/572.1 |

FOREIGN PATENT DOCUMENTS

| | | |
|---|---|---|
| JP | A-2001-188663 | 7/2001 |
| JP | A-2003-317048 | 11/2003 |
| JP | A-2003-341185 | 12/2003 |
| JP | A-2005-31153 | 2/2005 |
| JP | A-2005-35095 | 2/2005 |
| JP | 2005084184 | * 3/2005 |
| JP | A-2005-084184 | 3/2005 |
| JP | 2005035095 | * 10/2005 |

OTHER PUBLICATIONS

English translation for JP2005-035095.*
Jun. 28, 2011 Office Action issued in Japanese Patent Application No. 2007-152901 (with translation).

* cited by examiner

*Primary Examiner* — King Poon
*Assistant Examiner* — Iriana Cruz
(74) *Attorney, Agent, or Firm* — Oliff & Berridge, PLC

(57) ABSTRACT

A detection system includes: an acquiring unit that acquires document data representative of a document which includes a plurality of pages; a selector that selects, for each page of the document, a first printing sheet which contains a detected element or a second printing sheet which does not contain the detected element such that the first printing sheet is selected for at least one page; a supplier that supplies the first or the second printing sheet selected by the selector; a printer that sequentially prints the document acquired by the acquiring unit on the printing sheets supplied by the supplier; a detector that detects a detected element contained in a printing sheet on which the document is printed by the printer; and a reporter that reports detection of the detected element in a printing sheet by the detector.

11 Claims, 2 Drawing Sheets

PRINTING APPARATUS, DETECTION SYSTEM, AND METHOD COMPUTER READABLE MEDIUM FOR CREATING DOCUMENT

CROSS-REFERENCE TO RELATED APPLICATIONS

This application is based on and claims priority under 35 USC 119 from Japanese Patent Application No. 2007-152901 filed on Jun. 8, 2007.

BACKGROUND

1. Technical Field

The present invention relates to technology for insuring the security of a printed document.

2. Related Art

A confidential document should be protected from being copied and taken out of a controlled area without permission. As technology for preventing unauthorized taking out of a printed document is known.

SUMMARY

According to an aspect of the invention, there is provided a detection system including: an acquiring unit that acquires document data representative of a document which includes a plurality of pages; a selector that selects, for each page of the document, a first printing sheet which contains a detected element or a second printing sheet which does not contain the detected element such that the first printing sheet is selected for at least one page; a supplier that supplies the first or the second printing sheet selected by the selector; a printer that sequentially prints the document acquired by the acquiring unit on the printing sheets supplied by the supplier; a detector that detects a detected element contained in a printing sheet on which the document is printed by the printer; and a reporter that reports detection of the detected element in a printing sheet by the detector.

BRIEF DESCRIPTION OF THE DRAWINGS

Exemplary embodiments of the present invention will be described in detail based on the following figures, wherein.

DETAILED DESCRIPTION

Configuration of Exemplary Embodiment

Figure 1:
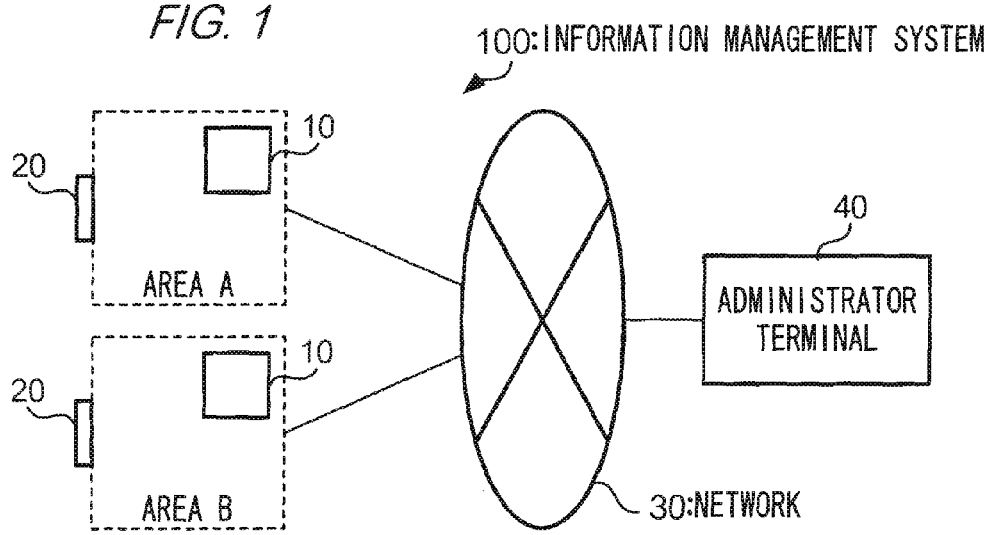
FIG. 1 shows the configuration of an information management system according to an aspect of the invention.

FIG. 1 shows the configuration of an information management system 100 according to one exemplary embodiment of the invention. The information management system 100 is, for example, a system constructed in an environment where documents are output (created) such as an office. As shown in FIG. 1, the information management system 100 is provided with multiple printers 10, multiple gate apparatuses 20, a network 30, and an administrator terminal 40.

Also, the environment where the information management system 100 is constructed includes multiple areas with different security levels. In this exemplary embodiment, it is assumed that there is an "area A" with a comparatively high security level and an "area B" with a comparatively low security level. In area A, documents with a comparatively high level of importance are output, and in area B, documents with a comparatively low level of importance are output. Also, although not particularly shown in FIG. 1, there is a user terminal such as a personal computer operated by a user in each area, and the user uses this user terminal to instruct a printer 10 to output a document.

Also note that the number of areas can be set as desired, and there may be three or more security levels for an area.

The printer 10 is an apparatus that records (i.e., prints) text or images to paper according to an instruction from a user. The recording system of the printer 10 is not particularly limited, and for example is an electrophotographic system, an inkjet system, or the like. At least one printer 10 is provided in each area. When multiple printers 10 are provided in a particular area, the security level may vary between the printers 10. For the sake of convenience, here a case will be described in which one printer 10 is provided in each area.

There are two types of paper used in the printers 10, "special paper" and "regular paper". In this exemplary embodiment, special paper is paper that includes a detected element, and regular paper is paper that does not include this detected element. Here, a detected element refers to an object that can be detected by a gate apparatus 20. As a detected element, it is possible to adopt, for example, a wire or foil body in which a large Barkhausen effect or magneto-strictive vibration occur, an RFID (Radio Frequency Identification) tag, or the like. It is desirable that the detected element is included by being embedded into the paper in order that the detected element is not easily recognized from external appearance.

Figure 2:
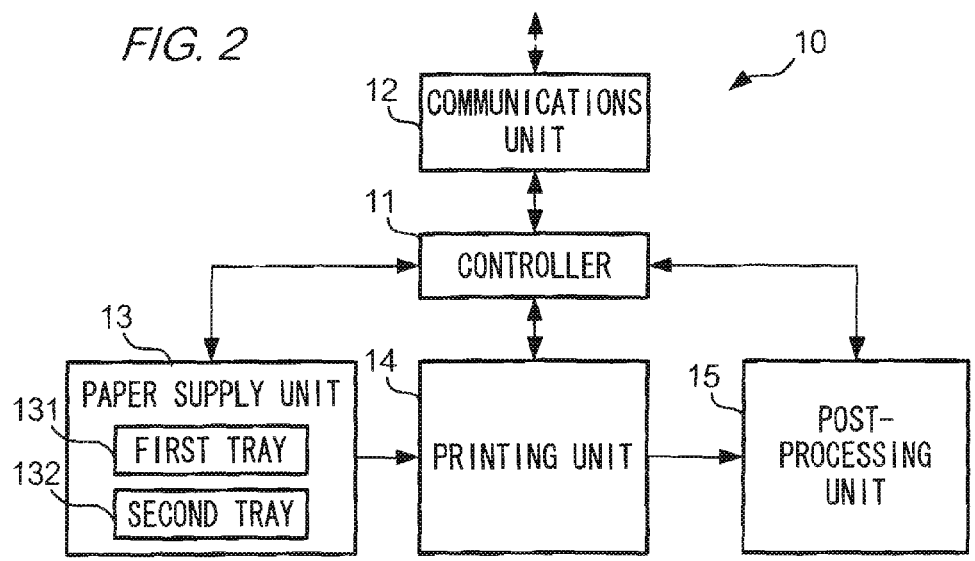
FIG. 2 is block diagram that shows the configuration of a printer according to an aspect of the invention.

FIG. 2 is a block diagram that shows the configuration of a printer 10. As shown in FIG. 2, the printer 10 is provided with a controller 11, a communications unit 12, a paper supply unit 13, a printing unit 14, and a post-processing unit 15. The controller 11 is provided with a CPU (Central Processing Unit), a memory, and the like, and controls operation of each unit of the printer 10. The communications unit 12 is an interface for communicating with the network 30 or a user terminal, and receives document data or policy information described below and supplies the received document data or policy information to the controller 11. The paper supply unit 13 is provided with a first tray 131 and a second tray 132, and supplies paper that has been stored in these trays in response to an instruction from the controller 11. Special paper is stored in the first tray 131 and regular paper is stored in the second tray 132.

In the printing unit 14, a document expressed by document data acquired via the controller 11 is printed on paper that has been supplied from the paper supply unit 13, and the printed paper is supplied to the post-processing unit 15. Here, document data is data that expresses a document that includes text or images, and that data corresponds to multiple pages of paper. The post-processing unit 15 performs processing (referred to below as "post-processing") that binds the paper corresponding to the multiple pages of paper on which text or images have been printed such that the paper becomes a single booklet. The post-processing unit 15 may bind paper with staples, or may bind paper with an adhesive. For convenience of description, in the present exemplary embodiment, a booklet that has been bound by the post-processing unit 15 is also referred to as a "document". That is, in this exemplary embodiment, "document" refers both to text or images expressed by document data, and a bound booklet in which these have been printed.

Figure 3:
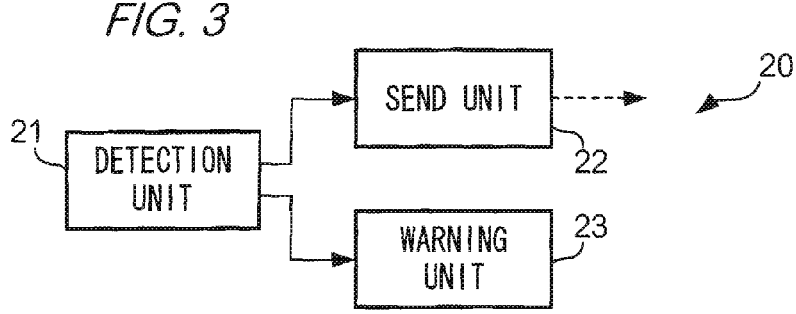
FIG. 3 is a block diagram that shows the configuration of a gate apparatus according to an aspect of the invention.

FIG. 3 is a block diagram that shows the configuration of the gate apparatus 20. As shown in FIG. 3, the gate apparatus 20 is provided with a detection unit 21, a send unit 22, and a warning unit 23. The detection unit 21 detects whether or not a detected element is present in a predetermined range. When the detection unit 21 detects a detected element, information expressing the presence of a detected element (referred to below as "detection information") is supplied to the send unit 22 and the warning unit 23. Of the detection unit 21, the concrete configuration and the detection range in which the detected element can be detected vary according to the type of detected element. The send unit 22 is an interface that connects to the network 30 and sends the detection information to the administrator terminal 40. The warning unit 23 is provided with a so-called revolving light, a speaker, and the like, and emits light and sound when acquiring detection information.

The gate apparatus 20 is provided at the border (for example, such as an entrance/exit) of each area, and detects that a document including a detected element has passed by. In the gate apparatus 20, when a document including a detected element has been detected, the gate apparatus 20 reports via the send unit 22 and the warning unit 23 that a document has been taken out. Also, in FIG. 1, there is only one gate apparatus 20, but when there are multiple borders of each area, it is desirable that multiple gate apparatuses 20 are provided.

The detection range in which the gate apparatus 20 can detect a detected element may change according to the manner in which a document is taken out. For example, in a case in which a user attempts to take out a document after inserting the document into a briefcase or bag, the detectable range is less than for a case in which the document is taken out as-is, and as a result there is a possibility that detection will fail.

Here, returning to the description of FIG. 1, the network 30 is for example a LAN (Local Area Network), and connects the printers 10, the gate apparatuses 20, the administrator terminal 40, and the user terminal to each other. The administrator terminal 40 is a computer used by an administrator of the mentioned system, and supplies policy information to the printers 10. Also, the administrator terminal 40 is provided with a monitor that monitors the detection information, and is configured so as to be capable of notifying the administrator of whether or not taking out of a document has occurred in each area.

Also, although not particularly shown in FIG. 1, the information management system 100 may also be provided with a camera that monitors entrance and exit of people at the border of each area. By doing so, it becomes possible to record video at the same time as detection by a gate apparatus 20, and also possible to identify a person.

The policy information expresses a security level, and indicates to what extent to include special paper when printing a document. In this exemplary embodiment, the policy information is a value that indicates that the security level is either "high" or "low". However, the policy information may also indicate multiple grades of the security level.

Operation in Exemplary Embodiment

The configuration of the information management system 100 is as follows. In the thus-configured information management system 100, the user uses a user terminal to instruct output of a document and a printer 10 outputs the document. When detecting that a document including a detected element has been taken out, the gate apparatus 20 reports this event. By operating in the above manner, the information management system 100 is capable of suppressing unauthorized taking out of a document.

When a printer 10 outputs a document, it acquires policy information from the administrator terminal 40, and controls the manner of printing the document according to the policy information. More specifically, the printer 10 performs printing while selecting, based on the policy information, whether the paper used for each page of the document is special paper or regular paper. The operation performed by the printer 10 in this case is as follows.

Figure 4:
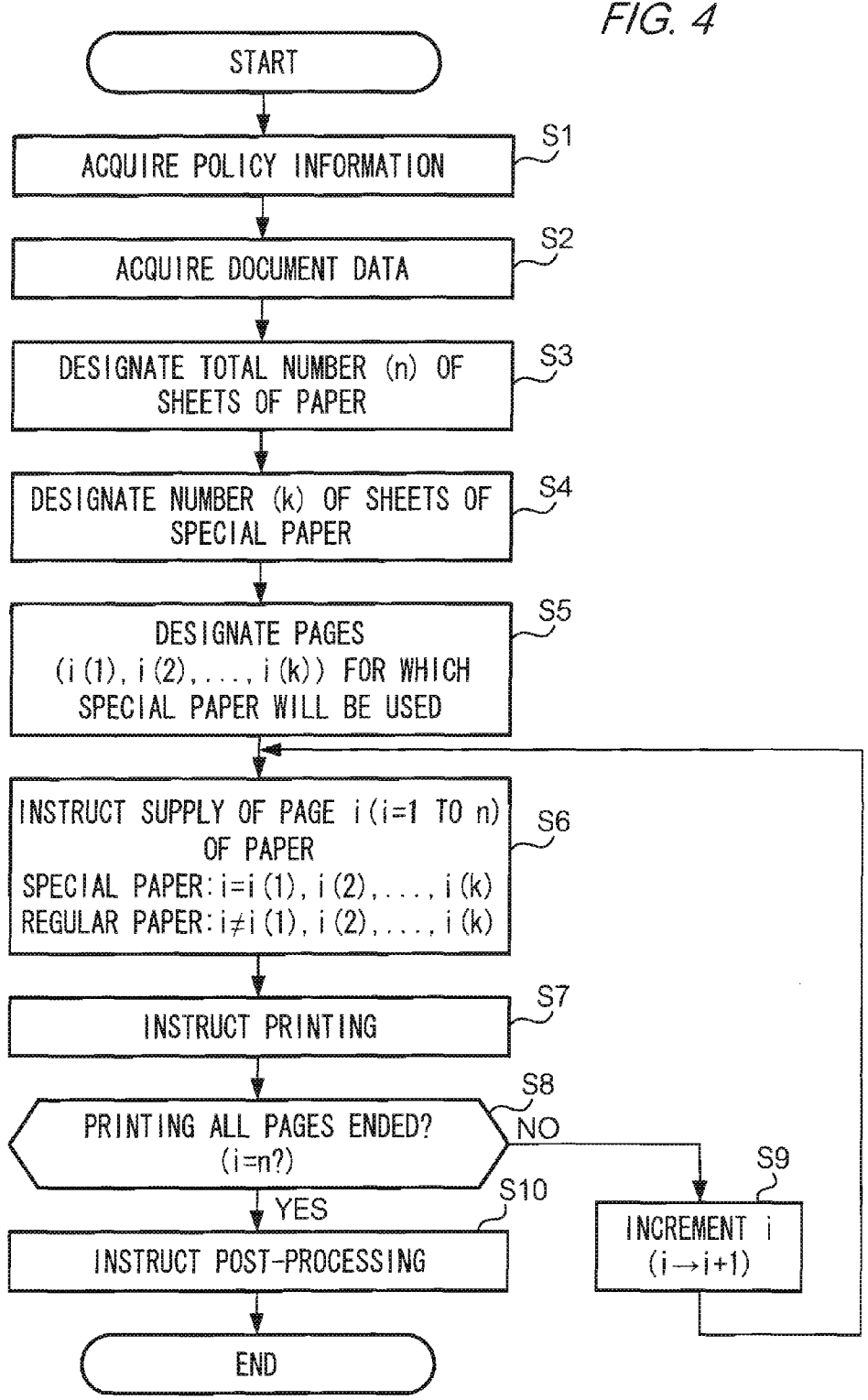
FIG. 4 is a flowchart that shows an operation of the printer.

FIG. 4 is a flowchart that shows the operation of the printer 10. As shown in FIG. 4, first, the controller 11 of the printer 10 acquires policy information (Step S1). The controller 11 may acquire the policy information either by making a request to the administrator terminal 40 for sending of the policy information, or by reading out that policy information which was sent by the administrator terminal 40 at a predetermined timing and stored in a memory. Next, the controller 11 acquires document data from the user terminal (Step S2).

Next, the controller 11 designates a total number (n) of printing sheets of paper to be used, based on the acquired document data (Step S3). Here, the value of n is designated from the number of pages of the document expressed by the document data. Specifically, if the number of pages is 10 pages, the value of n is "10".

Also, the controller 11 designates a number of sheets (k) of special paper among the paper to be used, based on the acquired policy information and the total number of sheets of paper (n)(Step S4), and further designates pages for which special paper will be used (Step S5). The ratio of special paper is determined so as to be higher in a case in which the security level indicated by the policy information is "high", and lower in a case in which the security level indicated by the policy information is "low". For example, the ratio of special paper may be determined such that when the security level is "high", 70% of the total number of sheets of paper is special paper, and when the security level is "low", 30% of the total number of sheets of paper is special paper. When, for example, the total number of sheets of paper is low, the ratio of special paper may be determined such that the number of sheets of special paper is greater than a predetermined ratio. For example, when the security level is "low", i.e. when 30% of the total number of sheets of paper is special paper, and the total number of sheets of paper is "5", because the number of sheets of special paper is not evenly divisible using the predetermined ratio (30%), the ratio of special paper may be set to two sheets (40%).

Also, the controller 11, in Step S5, appropriately selects the pages for which special paper will be used from among the total number of sheets of paper. For example, when the total number of sheets of paper is "10", and 70% of the total number of sheets of paper is set as special paper, the controller 11 may use special paper for pages 1 to 7, and use regular paper for pages 8 to 10. Alternatively, special paper and regular paper may be used in a pattern that satisfies a predetermined ratio, such that special paper us used for pages 1 and 2, regular paper is used for page 3, and special paper is used for pages 4 and 5. However, when special paper and regular paper have been used in a regulated manner, the user can guess which pages the special paper is used for. Therefore, it is more preferable that pages for which special paper will be used are selected in a random order, using random numbers or the like. In the above manner, of the total pages n, pages i(1), i(2), . . . , i(k) that will be printed using special paper are assigned.

After the pages for which special paper will be used are designated, the controller 11 instructs the paper supply unit 13 to supply paper in order beginning from the first page (Step S6). The value of a page for which supply is instructed here is referred to below as "i". More specifically, the value of i is an integer from 1 to n. The default value of i is "1".

At this time, when page i is selected as a page for which special paper will be used, i.e., when i is any of i(1), i(2), . . . , i(k), the controller 11 instructs to supply special paper, and when this is not the case, the controller 11 instructs to supply regular paper. In response to this instruction, the paper supply unit 13 supplies paper from either the first tray 131 (special paper) or the second tray 132 (regular paper).

Next, the controller 11 instructs the printing unit 14 to print page i of the document on the paper supplied by the paper supply unit 13 (Step S7). In response to this instruction, the printing unit 14 prints page i of the document on the supplied paper.

After printing of page i by the printing unit 14 ends, the controller 11 judges whether or not printing of all pages of the document has ended. That is, the controller 11 judges whether or not the value of i is n (Step S8). Here, when the value of i is not n (NO in Step S8), the controller 11 increases (increments) the value of i (Step S9), and again executes the processing of Step 6 and subsequent steps. For example, when the value of i is "1", the controller 11 increases this value by one page to "2", and instructs supply of paper and printing of the page 2.

On the other hand, when the value of i is n (YES in Step S8), the controller 11 judges that printing of all pages of the document expressed by the document data has ended. Then, the controller 11 instructs the post-processing unit 15 to execute post-processing (Step S10). In response to this instruction, the post-processing unit 15 binds all of the supplied paper for all pages into a single booklet.

The operation of the printer 10 is as follows. By performing this sort of operation, the printer 10 of this exemplary embodiment is capable of determining the ratio of special paper and regular paper based on policy information. Accordingly, with this printer 10, it is possible to set different security levels for each area where the printer 10 is installed, or to change the security level according to an instruction from the administrator terminal 40. Also, for example, the printer 10 may be programmed to automatically raise the security level when warnings frequently occur, without judgment of the administrator.

MODIFIED EXAMPLES

The invention can be carried out in a mode different from the embodiment described above. For example, the invention can be carried out in a mode as described below. Also, each of the modified examples disclosed below may be combined as appropriate.

(1) Modified Example 1

In the invention, when selecting a special paper (we call it "first sheet", hereafter) or a regular paper (we call it "second sheet", hereafter), this selection may be made not according to the policy information. For example, a user may designate either sheet for each page using an operating unit such as a button or a touch panel, or the first sheet and the second sheet may be selected alternately in advance.

Of course, there may also be a case in which a document is printed without including any first sheets, or a case in which a document is printed without including any second sheets.

(2) Modified Example 2

Multiple pieces of information that correspond to the "policy information" described above may be stored in advance in a printing apparatus (printer 10). In this case, for example, the user may designate a security level using an operating unit such as a button or a touch panel, or the security level may vary according to a time span. In the latter example, for example, the security level may be relatively low during working hours (i.e., a state in which viewing by many third parties is possible), and relatively high outside of working hours. In this case, a unit that judges the time span is provided in the printing apparatus.

(3) Modified Example 3

Information that corresponds to the "policy information" described above may be acquired along with document data, or may be included in the document data itself. For example, the document data may, as so-called header information or metadata, accompany information that corresponds to policy information. In such a case, because the security level can be changed for each piece of document data, for example, it is possible to perform printing such that a document with a high level of importance includes more first sheets (special paper), and a document with a low level of importance includes more second sheets (regular paper).

(4) Modified Example 4

In the invention, it is possible to perform exceptional processing according to the number of pages even when sheet selection is performed according to policy information. For example, when the number of pages is too small, first sheets (special paper) may be used for all pages regardless of the policy information, and when the number of pages is too large, first sheets may be not used above an upper limit for the number of first sheets.

In this example, a description is given in which p represents a detection ratio per one first sheet, P represents a detection ratio of a booklet (detection ratio when a whole booklet was taken out), and N represents the number of first sheets included in the booklet. In this case, the booklet detection ratio P can be expressed with equation (1) below. Below, the detection ratio p is assumed to be 50% (0.5).
(Equation 1)

$$P = 1 - (1-p)^N \quad (1)$$

For example, when the number of first sheets N is "1", the booklet detection ratio P is "50%". When the number of first sheets N is "2", the booklet detection ratio P is "75%". In this manner, the booklet detection ratio P becomes closer to "1", as the value of N increases. For example, when the detection ratio p is assumed to be 50%, if the value of N is "7" then the booklet detection ratio P exceeds "99%" and thereafter becomes about 100%.

In other words, whatever the value of the detection ratio p may be, the value of the booklet detection ratio P converges at "1" according to the increase in the value N. Therefore, for example, in a case in which 10 first sheets are included in a 100 page booklet, or in a case in which 50 first sheets are included, there is approximately no difference in the booklet detection ratio P. Accordingly, from the viewpoint of cost effectiveness, it is desirable that a predetermined value is set as an upper limit for the number of first sheets N, and above that limit first sheets are not used. The upper limit of N may be appropriately determined according to the detection ratio P allowed in the system, or the actual detection ratio p.

Also, depending on the type of special paper, there may be a case in which in the manufacturing process of that special paper there is sheet-to-sheet variation in the detection ratio p, and special paper having a low detection ratio p is deemed to be a defective good and therefore not used, but even this sort of special paper can be used without problem when the number of pages in a booklet is high.

On the other hand, when the number of pages in a booklet is too small, there may be instances when the booklet cannot be detected well even if first sheets are used according to the predetermined ratio. For example, when the number of pages in a booklet is "3", and of these a first sheet is used for one page, if the detection ratio p is 50%, the booklet detection ratio P also is limited to "50%". Therefore, in such a case, for example, first sheets may be used for all pages, so that the number first sheets used is greater than the predetermined ratio.

(5) Modified Example 5

The pages for which first sheets (regular paper) will be used may be selected according to a printing ratio or text ratio of each page. For example, with respect to a page in which more text or images are printed, there is a high possibility that more information is included than in other pages, and also a high possibility that important information is included. Therefore, with respect to such a page, there is a (comparatively) high possibility that a problem will occur when the page is extracted from a booklet and individually taken out. On the other hand, with respect to a blank page or a page in which there is almost no printing, there is a high possibility that almost no problem will occur even if that page is individually taken out.

Therefore, if a configuration is adopted in which the printing apparatus (printer 10) is provided with a unit that calculates the printing ratio (or number of characters) of each page of the document expressed by the document data, and a first sheet is preferentially selected for a page with a high printing ratio (or a large number of characters), it is possible to further suppress leakage of information. Here, "printing ratio" refers to, for example, a ratio of a region where printing is performed to a region where printing can be performed on a sheet. That is, more text or images or included in a page with a higher printing ratio.

(6) Modified Example 6

For example, when the pages for which first sheets (special paper) will be used are selected in a random order, the sheets to be supplied (i.e. trays) are frequently switched. When this sort of sheet switching is frequently performed, there is the problem of an increase in the time needed until document printing is completed.

Thus, in such a case, the sequence for printing each page may be changed so as to reduce the number of times for sheet switching. Specifically, a sequence may be adopted such that after designating the pages for which special paper (first sheets) will be used in Step 5 described above, printing of the pages designated here is performed first, and then printing of the other pages for which regular paper (second sheets) will be used is performed. For example, for a 5 page document, when special paper is used for pages 1, 3, and 5, and regular paper is used for pages 2 and 4, the printing of pages 1, 3, and 5 is collectively performed first, and the printing of pages 2 and 4 is performed afterward. Of course, a sequence may also be adopted such that printing of pages for which regular paper will be used is performed first, and printing of pages for which special paper will be used is performed afterward.

When printing is performed in a sequence that differs from the page sequence in this manner, the sequence in which paper is supplied to the post-processing unit 15 differs from the page sequence, so there happens the problem that if the pages are bound in a booklet as-is, the pages will not be arranged in the correct page order. Thus, in this sort of case, it is desirable that the post-processing unit 15 is further provided with a unit that changes the arrangement of paper, and the arrangement of paper is switched such that the paper is arranged in the page order.

(7) Modified Example 7

In the invention, there may be instances in which first sheets (special paper) and second sheets (regular paper) can be easily recognized, depending on the type of the detected element. In this sort of case, when all first sheet is extracted from a booklet, there is a risk that it will not be possible to detect unauthorized taking out. Thus, in order to make recognition (or distinguishment) of first sheets and second sheets difficult, a dummy image that simulates the detected element may be printed on second sheets.

(8) Modified Example 8

In the invention, the manner of acquiring document data is not particularly limited to that mentioned above. Document data can be acquired from various interfaces, whether wired or wireless. For example, document data may be acquired via an image capturing apparatus (scanner), in the manner of a so-called copy machine, or document data may be acquired from a removable storage medium.

(9) Modified Example 9

In the invention, "sheet" encompasses various types of paper. In the invention "sheet" encompasses not only so-called paper, but all sheet-like objects on which printing is possible. For example, in the invention, a "sheet" may be a sheet-like resin.

Also, in the invention, a "detected element" may be included in a sheet in any manner. In the embodiments described above, the detected element is embedded into the paper, but for example, the detected element may be bonded to the surface of the paper, or the detected element may be integrated with the paper in another manner.

(10) Modified Example 10

The invention can also be provided as a program for realizing the functions of the printing apparatus described above. This program may, for example, be downloaded to a printing apparatus via a network such as the Internet, or may be provided in a form stored on a recording medium such as an optical disk.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection system comprising:
an acquiring unit that acquires document data representative of a document which includes a plurality of pages;
a selector that selects, for each page of the document, a first printing sheet which contains a detected element or a second printing sheet which does not contain the detected element such that at least one of each of the first printing sheet and the second printing sheet is selected;
a supplier that supplies the first or the second printing sheet selected by the selector;
a printer that sequentially prints the document acquired by the acquiring unit on the printing sheets supplied by the supplier;
a detector that detects the detected element;
a reporter that reports detection of the detected element by the detector; and
a policy acquirer that acquires policy information relating to a security level of the document, wherein
the policy information includes a ratio of a total number of the first printing sheets to a total number of the second printing sheets,
the selector selects the first or the second printing sheets based on the policy information, and
the selector sequentially selects the first or the second printing sheets according to the ratio in a random order.

2. A printing apparatus comprising:
an acquiring unit that acquires document data representative of a document which includes a plurality of pages;
a selector that selects, for each page of the document, a first printing sheet which contains a detected element or a second printing sheet which does not contain the detected element such that at least one of each of the first printing sheet and the second printing sheet is selected;
a supplier that supplies the first or the second printing sheet selected by the selector;
a printer that sequentially prints the document acquired by the acquiring unit on the printing sheets supplied by the supplier; and
a policy acquirer that acquires policy information relating to a security level of the document, wherein
the policy information includes a ratio of a total number of the first printing sheets to a total number of the second printing sheets,
the selector selects the first or the second printing sheets based on the policy information, and
the selector sequentially selects the first or the second printing sheets according to the ratio in a random order.

3. The printing apparatus according to claim 2, wherein:
the document data includes the policy information; and
the policy acquirer acquires the policy information from the document data.

4. The printing apparatus according to claim 2, further comprising a calculator that calculates a printed area ratio for each page of the document, wherein the selector preferentially selects the first printing sheet for a page whose printed area ratio is high.

5. The printing apparatus according to claim 2, further comprising a sorting unit that changes an order of a plurality of sheets on which a document is printed by the printer, wherein:
the printer performs collective printings on a set of pages for which the first printing sheet is selected and on a set of pages for which the second printing sheet is selected; and
the sorting unit changes the order of the plurality of sheets on which the document is printed by the printer to an order designated by the document data.

6. The printing apparatus according to claim 2, wherein when printing a document on the second printing sheet, the printer prints a dummy image that simulates the detected element on the printing sheet.

7. A non-transitory computer readable medium storing a program causing a computer to execute a process for:
acquiring document data representative of a document which includes a plurality of pages;
selecting, for each page of the document, a first printing sheet which contains a detected element or a second printing sheet which does not contain the detected element such that at least one of each of the first printing sheet and the second printing sheet is selected;
supplying the selected first or second printing sheet;
sequentially printing the acquired document on the supplied printing sheets; and
acquiring policy information relating to a security level of the document, wherein
the policy information includes a ratio of a total number of the first printing sheets to a total number of the second printing sheets, and
selecting includes selecting the first or the second printing sheets based on the policy information and sequentially selecting the first or the second printing sheets according to the ratio in a random order.

8. A processor implemented method for creating a document, comprising:
acquiring document data representative of a document which includes a plurality of pages;
selecting, for each page of the document, a first printing sheet which contains a detected element or a second printing sheet which does not contain the detected element such that at least one of each of the first printing sheet and the second printing sheet is selected;
supplying the selected first or second printing sheet;
sequentially printing the acquired document on the supplied printing sheets; and
acquiring policy information relating to a security level of the document, wherein
the policy information includes a ratio of a total number of the first printing sheets to a total number of the second printing sheets, and
selecting includes selecting the first or the second printing sheets based on the policy information and sequentially selecting the first or the second printing sheets according to the ratio in a random order.

9. The detection system according to claim 1, wherein the detector is remote from the printer.

10. The detection system according to claim 1, further comprising at least one controlled area that includes the printer and has at least one security level.

11. The detection system according to claim 10, the detector further comprising a gate apparatus provided at a border of the at least one controlled area.

* * * * *